United States Patent Office 3,641,133
Patented Feb. 8, 1972

3,641,133
INTERMEDIATES IN THE PREPARATION OF 4-AMINODIBENZO[a,d]-CYCLOALKEN-5-ONES
Eugene E. Galantay, Morristown, and Hans Ott, Convent Station, N.J., assignors to Sandoz-Wander, Inc., Hanover, N.J.
No Drawing. Continuation-in-part of application Ser. No. 444,023, Mar. 30, 1965, now Patent No. 3,424,796. This application Sept. 30, 1968, Ser. No. 763,940
Int. Cl. C07c 101/54
U.S. Cl. 260—518 R          7 Claims

ABSTRACT OF THE DISCLOSURE

A 4-chloro-7-amino-3-substituted phthalide, e.g., 3-β-phenethyl-4-chloro-7-methylaminophthalide, is saponified and the saponification product reduced to obtain the corresponding 6-phen(alkyl)-anthranilic acid, e.g., 6-β-phenethyl-N-methyl-anthranilic acid, which is then cyclized to the corresponding pharmaceutically useful 4-amino-10,11-dihydro-5H-dibenzo[a,d]cyclohepten-5-one or 4-amino-5,10,11,12-tetrahydrodibenzo[a,d]cycloocten-5-one.

This application is a continuation-in-part of copending application Ser. No. 444,023, filed Mar. 30, 1965 now U.S. Pat. No. 3,424,796.

The present invention is directed to intermediates in the preparation of 4-amino-dibenzocycloalkenones, particularly pharmaceutically acceptable 4-amino-10,11-dihydro-5H-dibenzo[a,d]cyclohepten-5-ones and 4-amino-5,10,11,12-tetrahydrodibenzo[a,d]cycloocten-5-ones. The ring structure of the end-product compounds is depicted by the formula

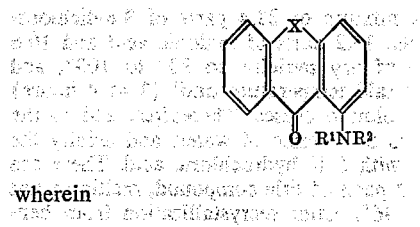

wherein

X is either dimethylene ($-CH_2-CH_2-$) or trimethylene ($-CH_2-CH_2-CH_2-$), and
$N(R^1)R^2$ is an amino moiety.

More specifically:

$R^1$ is either a hydrogen atom (—H) or lower alkyl, e.g., methyl, ethyl, propyl, isopropyl and butyl;
$R^2$ is either a hydrogen atom (—H); lower alkyl, e.g., methyl, ethyl, propyl, isopropyl and butyl; α-halo (lower)acyl, i.e. —CO—CHR—Y, e.g., iodoacetyl; or α-amino(lower)acyl, i.e. —CO—CHR—$NH_2$, e.g., glycyl; is either a hydrogen atom (—H) or lower straight chain alkyl, e.g., methyl, ethyl, propyl and butyl; and
Y is a halogen atom, e.g., —Cl, —Br, —F and —I.

Compounds I wherein $R^1$ and/or $R^2$ is a hydrogen atom are intermediates for the preparation of Compounds I wherein at least one of said hydrogen is replaced.

Compounds I are useful as hypotensive-antihypertensives, as indicated by the lowering of blood pressure in an anesthetized dog, measured with the aid of a mercury manometer or transducer via a catheter inserted in either the carotid or femoral artery of the anesthetized animal and recorded either on a kymograph or an appropriate electronic recorder.

For use as a hypotensive, i.e. in the treatment of hypertension noted above, the dosage administered may vary depending on the particular compound employed and the severity of the condition being treated. In small mammals, satisfactory results are obtained when administered orally or parenterally, at a daily dosage of from about 0.25 milligram to about 10 milligrams per kilogram of animal body weight. For large mammals the total daily dosage is from about 25 milligrams to about 75 milligrams of the compound, preferably given in divided doses, 2 to 4 times a day, or in sustained release form. The dosage forms suitable for internal use comprise from about 6.25 milligrams to about 38.5 milligrams of active compound in intimate admixture with a solid or liquid pharmaceutically acceptable carrier or diluent. The preferred pharmaceutical compositions from the standpoint of preparation and ease of administration are solid compositions, particularly hard-filled capsules and tablets containing from about 5 milligrams to about 50 milligrams of the active ingredient.

Each of the pharmaceutically active Compounds I may be, e.g., incorporated for oral administration in a tablet as the sole active ingredient. A typical tablet is consistituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; an average dosage of active ingredient; and q.s. 100 percent of filler, e.g., lactose; all percentages being by weight. Tablets are prepared according to standard tabletting techniques, which are well known in the art, employing the necessary amounts of conventional granulating liquids, e.g., alcohol SD-30 and purified water. An exemplary tabletting formulation with Compound I as active ingredient is:

| | Parts |
|---|---|
| 4-methylamino-10,11-dihydro-5H-dibenzo[a,d]cyclohepten-5-one | 15 |
| Tragacanth | 2 |
| Lactose | 74.5 |
| Corn starch | 5 |
| Talcum | 3 |
| Magnesium stearate | 0.5 |
| Alcohol SD-30 | q.s. |
| Purified water | q.s. |

The process for the preparation of those compounds wherein X is trimethylene employs the same starting material, but requires several additional steps to introduce the third —$CH_2$— group. The parallel processes are represented graphically:

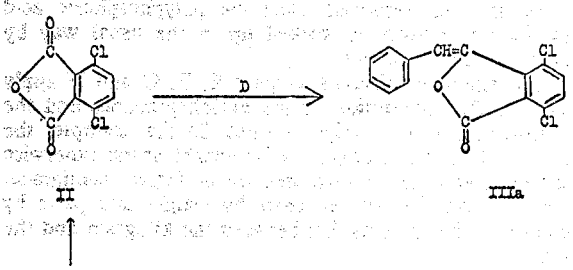

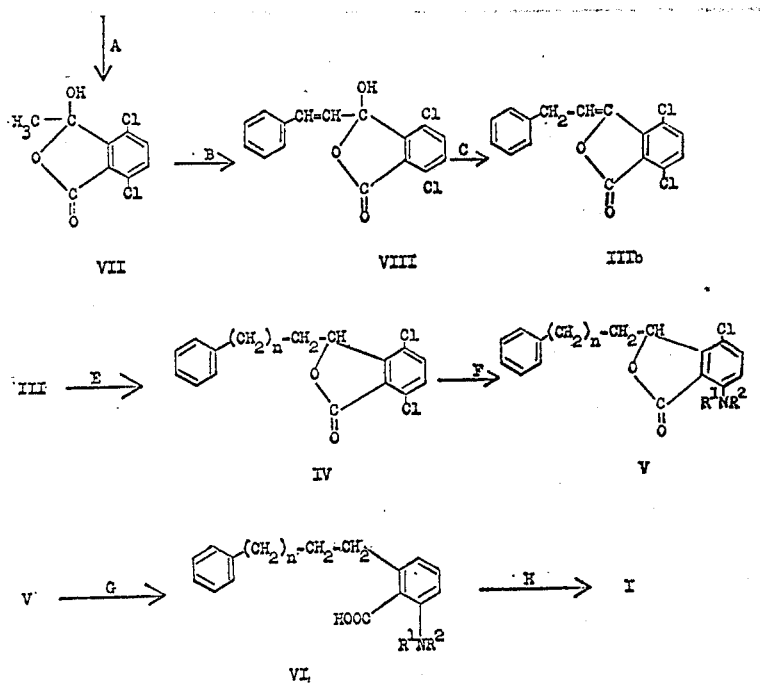

In the graphic representation n is 0 in the intermediates (a) for Compounds I wherein X is dimethylene, and n is 1 in the intermediates (b) for Compounds I wherein X is trimethylene.

A is the reaction of 3,6-dichlorophthalic anhydride with malonic acid in pyridine.

B is the reaction of VII with benzaldehyde in a basic medium, e.g., aqueous ethanol containing sodium hydroxide.

C is the hydrogenation of VIII, followed by dehydration.

D is the condensation of 3,6-dichlorophthalic anhydride with phenylacetic acid to phthalide IIIa. [See Ukrainakii Khimicheakii Zhurnal, 19, 421 to 428 (1953).]

E is the reduction of III with hydriodic acid and red phosphorus. This reduction affects only the double bond of III and leaves the lactone ring unchanged. [The unchlorinated analogue of Compound IIIa is reduced under these conditions to 2-β-phenethylbenzoic acid.]

F is the aminolysis (or ammonolysis) of IV (effected quantitatively without reaction with the lactone ring).

G is the saponification of the lactone group of V, followed by catalytic reduction (hydrogenation).

H is the ring closure (cyclization) with polyphosphoric acid.

The process is based upon the polyphosphoric acid cyclization of 6-β-phenethyl- and 6-γ-phenylpropyl- anthranilic acids VI to Compounds I, wherein each of $R^1$ and $R^2$ is, independently, either a hydrogen atom (—H) or lower alkyl. If the amino group in the anthranilic acid VI is primary or secondary, i.e. if either $R^1$ and/or $R^2$ is a hydrogen atom, it must be protected prior to cyclization. This protection is best achieved by para-toluenesulfonation or methanesulfonation. After the cyclization is effected, either of these groups is readily hydrolyzed. They are thus removed when the polyphosphoric acid cyclization mixture is worked up in the usual way by pouring same onto ice.

The examples directed to steps E, F, G and H apply to both the preparation of the cycloheptenones and the preparation of the cyclooctenones. In the examples the parts and the percentages are by weight unless otherwise specified, and the temperatures are in degrees centigrade. The relationship between parts by weight and parts by volume is the same as that between the kilogram and the liter.

EXAMPLE 1

3-hydroxy-3-methyl-4,7-dichlorophthalide

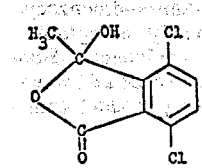

Heat slowly a mixture of 23.4 parts of 3,6-dichlorophthalic anhydride, 13.2 parts of malonic acid and 10.6 parts by volume of dry pyridine to 90° to 100°, and maintain same at said temperature until (3 to 4 hours) carbon dioxide evolution ceases. Thereafter, add to the resultant 100 parts by volume of water, and acidity the product to pH 2 with 5 N hydrochloric acid. There are thus obtained 23.2 parts of title compound, melting point (M.P.) 140° to 146°. After recrystallization from benzene, the pure title compound melts at 149°.

EXAMPLE 2

3-hydroxy-3-β-styryl-4,7-dichlorophthalide

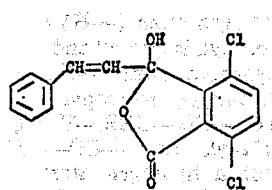

To a solution of 19.6 parts of the title compound of Example 1 and 9.78 parts of benzaldehyde in 150 parts by volume of ethanol add 18.36 parts by volume of 5.5 N (aq.) sodium hydroxide. Maintain the resulting mixture at room temperature (20°) for 90 minutes, and then add thereto 900 parts by volume of water. Concentrate the resultant in vacuo to 190 parts by volume to remove most of the ethanol. Extract the concentrate with diethylether, and discard the other extracts. The aqueous phase is essentially a solution of the sodium salt of the title compound, which need not be isolated for step C. The free title compound is obtained, however, by acidification of the above solution, M.P. 153° to 156°.

EXAMPLE 3

3-β-phenethylidene-4,7-dichlorophthalide

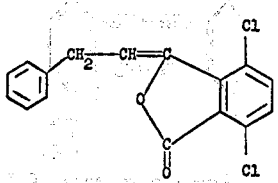

Add to said aqueous solution of Example 2 Raney nickel catalyst, and hydrogenate the obtained mixture at 50 p.s.i.g. and room temperature until no more hydrogen is taken up. Filter off the catalyst, acidify the filtrate with 5 N hydrochloric acid to pH 2, and extract with ethyl acetate to obtain 22.2 parts of a yellow gum. Heat the extracted gum to 200° under 90 millimeters (mm.) pressure for 180 minutes. Cool and stir the product with 30 parts by volume of methanol to obtain 8.35 parts of title compound, M.P. 140° to 142°.

EXAMPLE 4

3-benzyl-4,7-dichlorophthalide

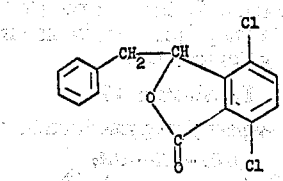

Reflux a mixture of 20 parts of 3-benzal-4,7-dichlorophthalide, 7 parts of red phosphorus and 300 parts by volume of 58% (aq.) hydriodic acid for 17 hours. Cool the refluxed mixture to room temperature. Add methylene dichloride, filter off and wash the red phosphorus with water and methylene chloride. Separate the methylene chloride solution, wash with sodium hydrocarbonate and with water, dry and evaporate. Crystallize the produced residue from diethylether/petroleum ether to obtain 19.5 parts of title compound, M.P. 94° to 96°.

EXAMPLE 5

3-β-phenethyl-4,7-dichlorophthalide

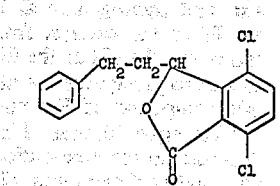

Reflux for 2 hours a mixture of 7.4 parts of 3-β-phenethylidene-4,7-dichlorophthalide, 1.63 parts of red phosphorus and 34 parts by volume of 58% (aq.) hydriodic acid. After adding 1.6 parts of red phosphorus, continue refluxing for another 16 hours. On cooling the thus-refluxed mixture, an upper layer is formed; this layer solidifies. Filter. Wash the solids with water and with hot ammonium hydroxide. Then crystallize the washed solids from diethylether to obtain 5.85 parts of title compound, M.P. 124° to 126°.

EXAMPLE 6

3-benzyl-4-chloro-7-methylaminophthalide

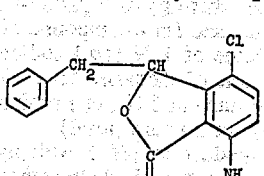

Heat over night (17 hours) in a pressure (closed) apparatus at 160°, a mixture of 8.33 parts of 3-benzyl-4,7-dichlorophthalide and 100 parts by volume of 20% ethanolic methylamine. Evaporate the product to dryness. Dissolve the residue in methylene chloride, and wash the obtained methylene chloride solution with water. Dry and evaporate the thus-washed solution; recrystallize the residue from diethylether/petroleum ether to obtain 7.33 parts of title compound, M.P. 87° to 89°.

EXAMPLE 7

3-benzyl-4-chloro-7-aminophthalide

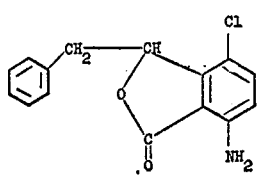

Heat over night at 160° in a closed system, a mixture of 8.33 parts of 3-benzyl-4,7-dichlorophthalide and 100 parts by volume of 20% ethanolic ammonia. Evaporate the product to dryness. Dissolve the residue in methylene chloride, and wash the obtained methylene chloride solution with water. Dry and evaporate the thus-washed solution to obtain the title compound.

EXAMPLE 8

3-benzyl-4-chloro-7-dimethylaminophthalide

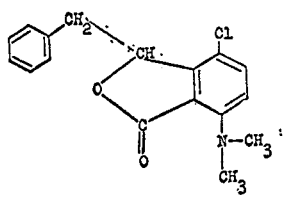

Heat over night at 160° in a closed system a mixture of 8.33 parts of 3-phenzyl-4,7-dichlorophthalide and 100 parts by volume of 20% ethanolic dimethylamine. Evaporate the product to dryness. Dissolve the residue in methylene chloride, and wash the obtained methylene chloride solution with water. Dry and evaporate the thus-washed solution to obtain the title compound.

EXAMPLE 9

3-benzyl-4-chloro-7-piperidylphthalide

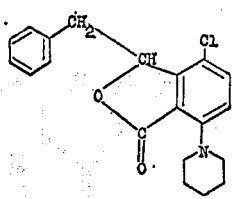

Heat over night at 160° in a pressure apparatus a mixture of 8.33 parts of 3-benzyl-4,7-dichlorophthalide and 100 parts by volume of 20% ethanolic piperidine. Evaporate the product to dryness. Dissolve the residue in methylene chloride, and wash the obtained methylene chloride solution with water. Dry and evaporate the thus-washed solution to obtain the title compound.

EXAMPLE 10

3-β-phenethyl-4-chloro-7-piperidylphthalide

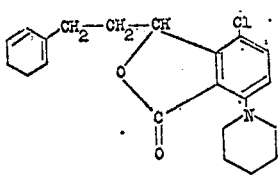

Heat at 150° in a closed apparatus for 24 hours a mixture of 2.5 parts of 3-β-phenethyl-4,7-dichlorophthalide with 40 parts by volume of 50% ethanolic piperidine. Cool the obtained mixture to room temperature and evaporate same to dryness to obtain the title compound.

EXAMPLE 11

3-β-phenethyl-4-chloro-7-dimethylaminophthalide

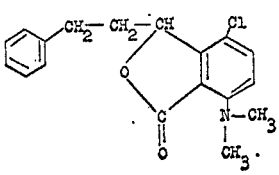

Heat at 150° in a pressure apparatus for 24 hours a mixture of 2.5 parts of 3-β-phenethyl-4,7-dichlorophthalide with 40 parts by volume of 50% ethanolic dimethylamine. Cool the obtained mixture to room temperature and evaporate same to dryness to obtain the title compound.

EXAMPLE 12

3-β-phenethyl-4-chloro-7-aminophthalide

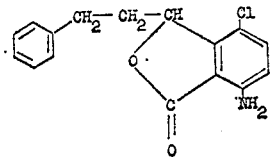

Heat for 24 hours in a closed system at 150° a mixture of 2.5 parts of 3-β-phenethyl-4,7-dichlorophthalide with 40 parts by volume of 50% ethanolic ammonia. Cool the obtained mixture to room temperature and evaporate same to dryness to obtain the title compound.

EXAMPLE 13

3-β-phenethyl-4-chloro-7-methylaminophthalide

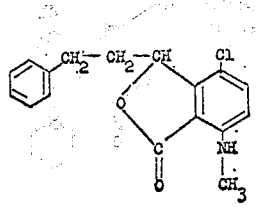

Heat in a closed system for 24 hours at 150° a mixture of 2.5 parts of 3-β-phenethyl-4,7-dichlorophthalide with 40 parts by volume of a 50% ethanolic methylamine solution. Cool the obtained mixture to room temperature, evaporate same to dryness, and recrystallize the solid residue from methanol to obtain the title compound, M.P. 70° to 71°.

EXAMPLE 14

6-β-phenethyl-N-methylanthranilic acid

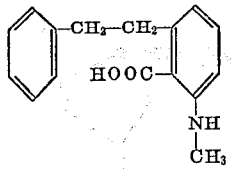

Reflux for 15 minutes a mixture of 7.33 parts of 3-benzyl-4-chloro-7-methylaminophthalide (title compound of Example 6), 3.85 parts of potassium hydroxide and 12 parts by volume of water. Evaporate the refluxed material to dryness, and maintain the residue at 170° to 180° for 3 hours.

Add to the thus-treated residue 150 parts by volume of water and 3.8 parts of palladium/carbon (10%) catalyst prior to hydrogenating at 80° under 40 p.s.i.g. hydrogen pressure. Cool the hydrogenated product to room temperature, and filter the cooled product from the catalyst. Neutralize the filtrate with hydrochloric acid to precipitate 4.45 parts of title compound, M.P. 123° to 125°. Replacing the title compound of Example 6 with an equivalent of that of Example 7, that of Example 8 or that of Example 9 results in the preparation, in the same manner, of the corresponding Compound VI.

EXAMPLE 15

N-methyl-6-γ-phenylpropylanthranilic acid

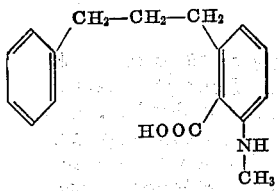

Stir a mixture of 30 parts of 3-β-phenethyl-4-chloro-7-methylaminophthalide (title compound of Example 13), 15 parts of potassium hydroxide and 50 parts by volume of water at 100° until solution occurs. Dilute the obtained solution with an additional 20 parts by volume of water. Adjust the pH of the thus-diluted product to 8.5 with acetic acid. Add 8 parts of palladium/carbon (10%) catalyst to the resultant, and hydrogenate at 80° under 50 p.s.i.g. of hydrogen. Filter the catalyst from the hydrogenated product, and adjust the pH of the filtrate to about 6 with hydrochloric acid to precipitate the title compound.

Replacing the title compound of Example 13 with an equivalent of that of Example 10, that of Example 11 or that of Example 12 results in the preparation, in the same manner, of the corresponding Compound VI.

EXAMPLE 16

4-methylamino-10,11-dihydro-5H-dibenzo[a,d]cyclohepten-5-one

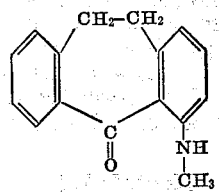

Add 4.4 parts of para-toluenesulfonic acid chloride to a solution (under stirring) of 5 parts of 6-β-phenethyl-N-methylanthranilic acid (title compound of Example 14) in 41 parts by volume of 1 N (aq.) sodium hydroxide and 50 parts by volume of dioxane. After 15 minutes add 20 more parts by volume of 1 N (aq.) sodium hydroxide, and continue stirring for 2 hours (total).

Acidify the product to pH 1 with hydrochloric acid, and extract therefrom with diethylether 7 parts of oil. Heat the oil in admixture with 120 parts of polyphosphoric acid to 170° to 180° for 50 minutes, and pour the obtained product onto ice. Extract material with methylene chloride, and pass the produced methylene chloride solution (after drying same) through 20 parts of alumina. Evaporate the methylene chloride fractions and recrystallize the residue from diethylether to obtain 2.29 parts of title compound, M.P. 122° to 123°.

Replacing the title compound of Example 14 with an equivalent of any of the compounds contemplated in Examples 14 and 15 results in the preparation, in the same manner, of the corresponding Compound I.

Various changes may be made in the intermediates and in the process details without departing from the spirit and scope of the invention or sacrificing its material advantages. The disclosed compounds and the working examples merely provide illustrative embodiments. Reactions A to H are independent of inert substituents on the several aromatic rings.

What is claimed is:

1. A compound of the formula:

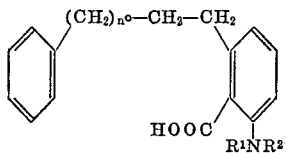

wherein each of $R^1$ and $R^2$ is, independently, either a hydrogen atom or lower alkyl, and $n°$ is 0 or 1.

2. A compound of claim 1 wherein $n°$ is 0.

3. The compound of claim 2 wherein each of $R^1$ and $R^2$ is a hydrogen atom.

4. A compound of claim 1 wherein $n°$ is 1.

5. The compound of claim $R^1$ is a hydrogen atom and $R^2$ is methyl.

6. The compound of claim 2 wherein $R^1$ is a hydrogen atom and $R^2$ is methyl.

7. The compound of claim 4 wherein each of $R^1$ and $R^2$ is a hydrogen atom.

References Cited

UNITED STATES PATENTS 3,458,578    7/1969    Galontay _____ 260—518 R

LORRAINE A. WEINBERGER, Primary Examiner

L. A. THAXTON, Assistant Examiner

U.S. Cl. X.R.

260—240 P, 294.3 C, 343.4, 562 B, 562 N, 576, 578; 424—324, 330

UNITED STATES PATENT AND TRADEMARK OFFICE
CERTIFICATE OF CORRECTION

PATENT NO. : 3,641,133
DATED : February 8, 1972
INVENTOR(S) : Eugene E. Galantay, and Hans Ott It is certified that error appears in the above-identified patent and that said Letters Patent are hereby corrected as shown below:

Column 1, line 56, " glycyl; is either ", should read -- glycyl; R is either --.
Column 2, line 3, " hydrogen " should read -- hydrogens --.
Column 2, at the bottom delete the arrow.
Column 4, line 46, " acidity " should read -- acidify --.
Column 6, line 47, " phenzyl " should read -- benzyl --.
Column 10, line 7, Claim 5, " claim $R^1$ " should read -- claim 4 wherein $R^1$ --
Column 10, line 16, References Cited, " Galontay " should read -- Galantay --.

Signed and Sealed this second Day of September 1975

[SEAL]

Attest:

RUTH C. MASON
Attesting Officer

C. MARSHALL DANN
Commissioner of Patents and Trademarks